Oct. 28, 1969   E. W. OLSEN   3,474,911
FILTERS
Filed Dec. 11, 1967   2 Sheets-Sheet 1

3,474,911
FILTERS
Edward W. Olsen, Port Sulphur, La., assignor to Freeport Sulphur Company, New York, N.Y., a corporation of Delaware
Continuation-in-part of application Ser. No. 396,342, Sept. 14, 1964. This application Dec. 11, 1967, Ser. No. 691,114
Int. Cl. B01d 29/04
U.S. Cl. 210—318     2 Claims

ABSTRACT OF THE DISCLOSURE

A filter for filtering liquid comprising a housing with a plurality of filter elements in the housing connected, in parallel, at their outlets to an outlet manifold and a guard screen in the outlet having openings not substantially smaller than 1.2 times and not substantially greater than 2.5 times the size of the openings in the filter element, the guard screen permitting liquid filtered by the filter element to pass into the outlet manifold and preventing liquid which has not been filtered from passing into the outlet manifold.

---

This is a continuation-in-part of U.S. Application Ser. No. 396,342, filed Sept. 14, 1964, now abandoned, and relates to improvements in filters for use in cleaning or clarifying liquids.

The cleaning and clarification of liquids by filtration is an old and widely-used process. It is applied for clarifying widely diverse materials, such as, water, wine, beer, syrup, oil, varnish, sulfur, and similar materials. Clarification of these and other liquid is necessary, or at least desirable, to improve their salability through improved appearance, and to remove solid contaminants that would be harmful in the use to which the liquid is put. For example, it is essential that lubricating oil be free of solid particles which would be abrasive in bearings, or which would clog small conduits through which the oil is pumped to the bearings. Another example of the need for filtration occurs in the production of sulfur. Sulfur of commerce is an extremely pure material, containing less than 0.5% total impurities. The presence of solid particles of rock or of salt, derived from the deposit from which the sulfur is mined or otherwise, would make the sulfur unacceptable for many purposes. To insure freedom from these contaminants, sulfur produced by the Frasch process is frequently filtered while molten.

Filters are designed in a wide variety of styles and configurations. Generally, they include a container or housing through which the liquid is pumped under pressure. A filter element is contained in the housing. The liquid, as it is pumped through the housing, is passed through the filter element. As the liquid passes through the filter element, the particles to be removed are filtered from the liquid. In some instances the filter element is built into and is an integral part of the container or housing. More frequently, however, the filter element is a separate unit, constructed to fit into the container or housing, and can be removed for cleaning, servicing or replacement.

The filtering portion of the filter element may be fabricated from a wide variety of materials depending to a great extent, on the material to be filtered, the particles to be removed, the pressures to be employed, and other factors. Such material may be a metal screen, cloth, paper, ceramic, sintered powder metal, and a wide variety of other porous materials containing numerous, substantially uniformly sized, small openings. Where the filter element is removable, such porous material is usually fixed to a support frame. In the filtering operation the particles removed, or filtered out, deposit on the inlet side of the filter element forming a porous coating or cake. Some of the particles of this initial cake may be smaller than the size of the openings of the filter element since the smaller particles coagulate or bridge over in clusters over the openings. A small percentage of the smaller particles pass through the filter element and are recycled with the liquid to the filter element until a continuous coating of the filter element results.

These particles, both large and small, that form the initial cake may be present in the liquid as contamination to be removed in the filtering operations. The nature of these solid particles may be such that a cake or coat of desirable characteristics is obtained and the resultant cake is porous and with continued buildup in the filtering operation does not cause excessive pressure drop increases.

In many cases the particles present in the liquid as contaminates will not form a cake of desirable porosity and filtering characteristics and therefore solid materials may be added to the liquid prior to filtering or may be added to liquid already filtered and such filtered liquid, with the solid material added, may be pumped through the filter before the filter is used. These solid materials are conveniently referred to as "filter aids" and the preliminary operation places a "precoat" of filter aid on the screen and improves subsequent filtering action.

The particles of solid material used as filter aids to precoat the filter element may be of a size smaller than the openings in the filter screen. As with the initial coating action when no filter aids are added, the smaller particles coagulate or bridge over in clusters over the openings. A small percentage of the smaller particles pass through the filter element and are recirculated with the liquid to the filter elements until a continuous coating referred to as precoat results in subsequent removal of all of the smaller particles.

The purpose of recycling the liquid during precoating is obvious. Because the solid particles of the precoat material are smaller than the filter openings, some of these particles pass through the filter during the initial stages of precoating. As precoating continues, these particles collect on the filter element and form bridges or arches across the openings. As precoating continues, these bridges or arches reduce the effective size of the openings, cause the precoat particles in the recycled liquid to be retained and the pre-coat cake to form. Once the cake is formed, however, the particles are not passed. The proper formation of the cake may be determined by examining the liquid discharged from the filter but, usually, is accomplished by recycling the liquid for a predetermined period of time after the filter is installed. Recycling is then stopped and the filtered liquid is discharged from the filter to storage or to the process for use.

After the initial coating of the filter elements is completed by recirculating liquid with or without the addition of filter aids, the filtration operation or cycle is started by pumping the liquid to be clarified or filtered through the filter. The solids are deposited as a cake on the inlet side of the filtering elements and the operation is continued until a thickness of the cake reaches a limit and/or the flow through the cake is sufficiently decreased because of increased pressure drop to result in uneconomical operation. The filter is then opened and the cake or deposit removed from the surface of a filter element or elements. After the deposit is removed, the filter is closed and filtration cycle, starting with the coating operation, is resumed.

One of the major difficulties with many filters is that the filter portions are fragile and develop tears and holes even during normal use. When such a tear or hole occurs, unfiltered material and portions of the deposit of contaminating material previously filtered and deposited on the inlet side of the filter are carried through the tear or hole by the liquid and into the liquid already filtered. Thus, the filtered liquid is contaminated. Such contamination is aggravated by the passage of considerably more of the liquid through the tear or hole than through the undamaged area because the tear or hole offers much less resistance to flow.

Oftentimes tears or holes, when they occur, may be so small that they are undetected on visual inspection of the filter element. Where a number of filters are connected in parallel in the system, which is often the case in commercial processing, it may be necessary to remove and temporarily replace all of the filter elements in the system and to clean and inspect each of the removed elements minutely to locate the single defective element. Even with such a costly and time-consuming operation, some contamination of the filtered product has already occurred.

Attempts have been made heretofore to detect filter failures and to prevent contamination of the filtered product. One such attempt is shown in United States Patent No. 2,402,553, issued June 25, 1946. In such patent the filtered liquid, after it passes through the filter, is passed through a second filtering unit. If one of the filtering elements in the first filter fails, such as, by developing a hole or tear, the solid material which passes through the hole or tear is caught by the second filter element, causing the second filter element to plug and obstruct the flow. With the flow obstructed the liquid in the second filter overflows, setting off an alarm and automatically stopping the pumping of the liquid to be filtered. Thus, the complete filtering operation is interrupted until the first filter is disassembled, inspected, the defective filter element replaced, and the filter element of the second filter is cleaned. The system of this patent gives no indication as to which of the filter elements is defective and the arduous process of cleaning and minutely inspecting each filter element must be carried out. In addition, the system of this patent requires a rather large second filtering unit and cumbersome associated equipment.

One of the objects of the instant invention is to provide a filtering system in which the liquid flow is automatically stopped, when the filter element fails, in such a way that contaminated liquid passing through the defective screen does not contaminate the previously filtered liquid nor the liquid being filtered by other filtering elements connected in parallel in the system and which are in satisfactory condition for continued operation, that is, are not defective.

A further object is to provide such a system which is compact and in which each filtering unit which may become defective such as, through a hole in the element or by tearing, may be clearly evident when the elements are removed.

A further object of this invention is to provide a filter system incorporating means which automatically stop the flow of liquid when a filter element fails, such means being located in the outlet path of each filter element so that each of said means and each of said filter elements may be individually removed, inspected and, if necessary, replaced.

A still further object of this invention is to provide such a system which is readily adaptable to, and can be incorporated in, existing systems with a minimum of change and alteration.

These and other objects will be more readily apparent from the following description and attached drawings in which:

FIG. 3 is a cross-sectional view of one of the components of FIG. 2;

FIG. 4 is a cross-sectional view of a modification, and

FIG. 5 is a cross-sectional view of one of the components of FIG. 4.

Figure 1:
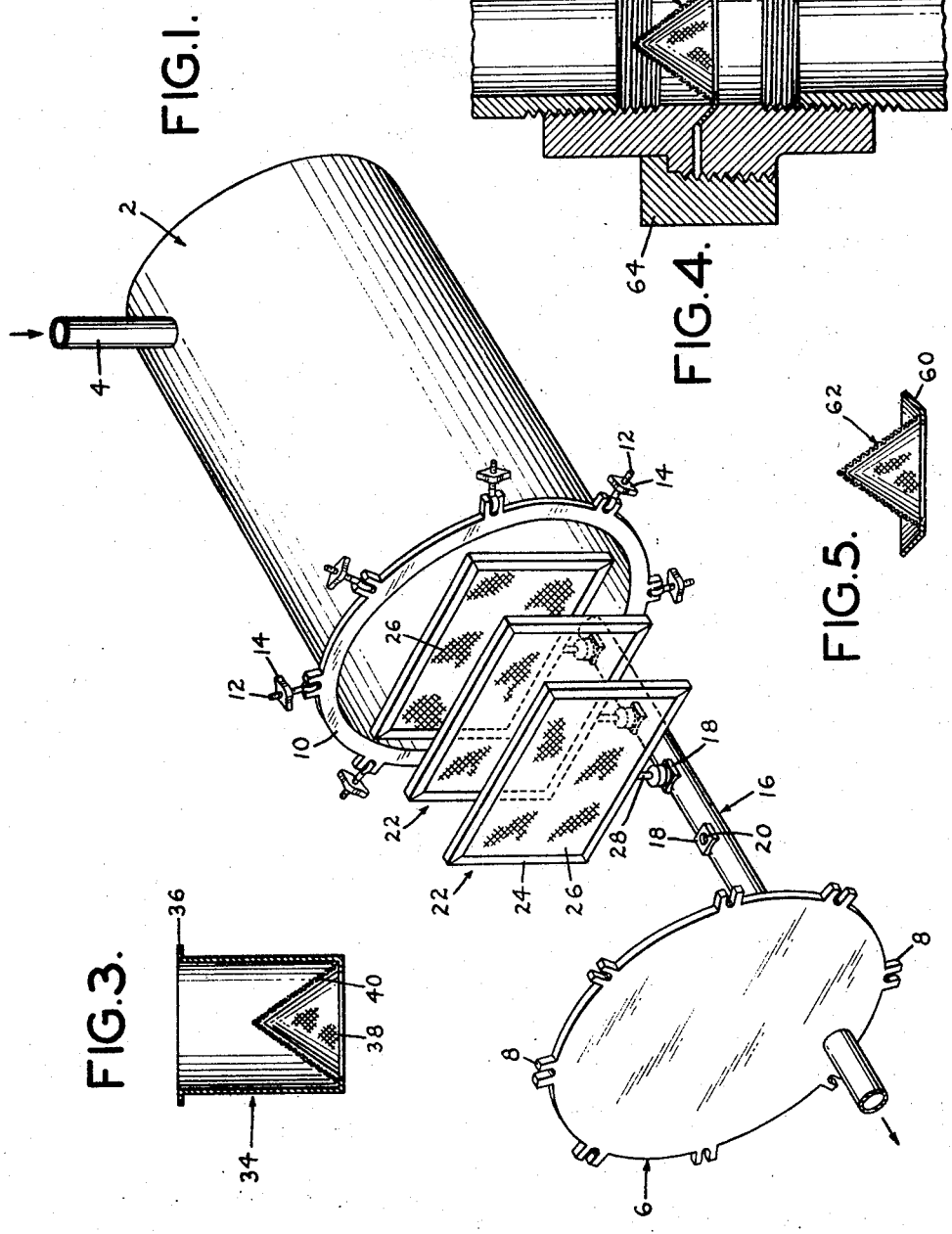
FIG. 1 is an exploded perspective view of a filter to which the instant invention has been adapted.

Referring now to FIG. 1, there is shown a standard type of filter to which the instant invention has been adapted. It is to be understood that this filter is merely for purposes of illustration. The invention is readily adaptable to other types of filters.

The filter of FIG. 1 has a housing 2 having an inlet 4 and a cover 6. Cover 6 has lugs 8 which, when cover 6 is in contact with flange 10 on housing 2, are engaged by bolts 12. Cover 6 is held in sealing contact by nuts which are tightened on bolts 12 and clamp cover 6 to housing 2.

Outlet manifold 16 is connected to cover 6 by welding, brazing, or similar means, and is provided with bosses 18 having holes 20 which extend through and into the manifold. A series of filter elements, generally designated 22, have a channel-shaped frame 24 faced on either side of the channel by filter screen 26. Filter screens 26 are fastened by welding, brazing, or any other suitable means, to the opposite legs of channel 24 to form a liquid-tight connection between the filter screen and frame. Thus, filter screens 26 are framed by channel-shaped frame 24 and, when the filter screens are intact, the liquid to be filtered passes into the center of the frame through the openings in filter screens 26.

Figure 2:
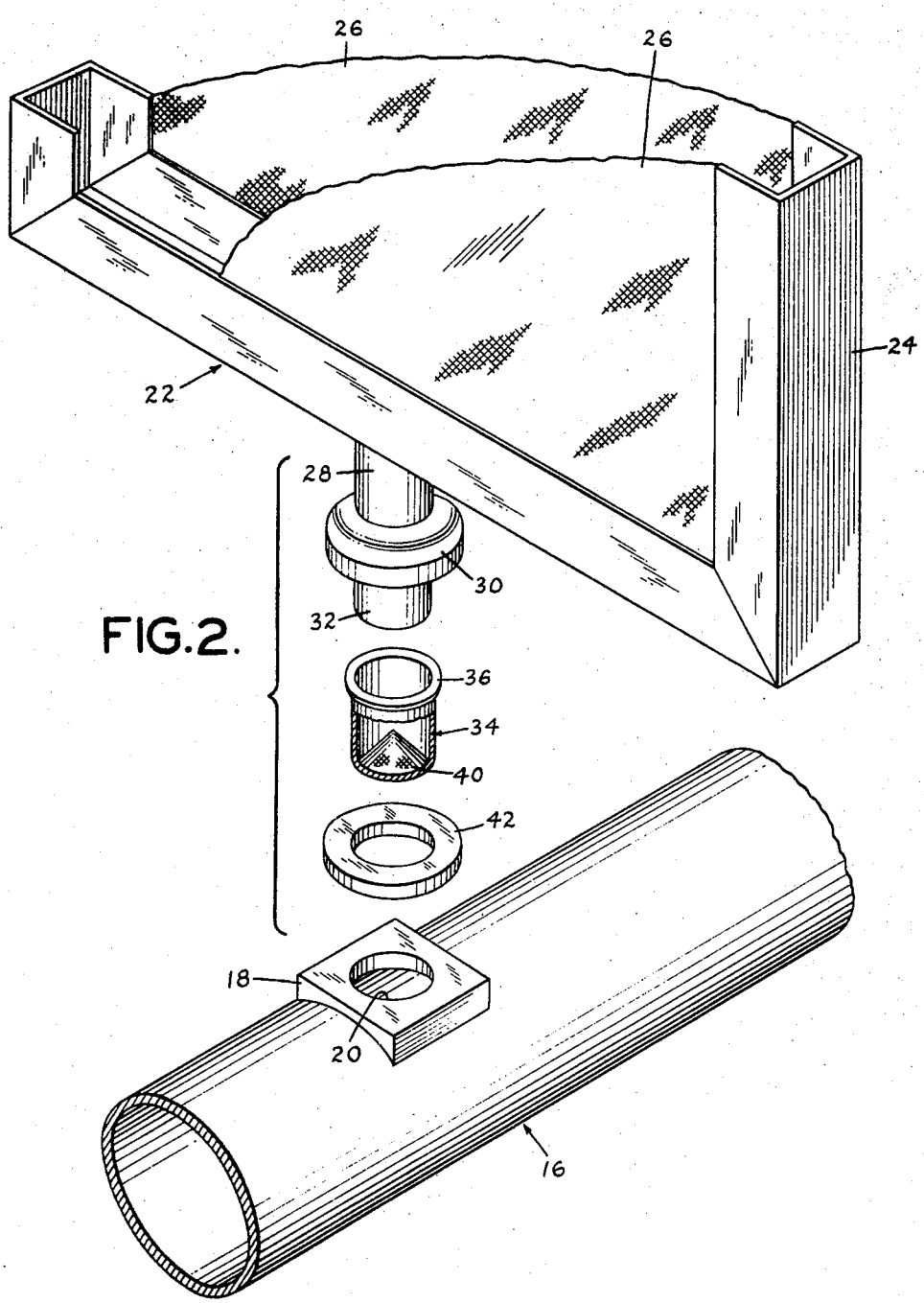
FIG. 2 is an enlarged exploded perspective view, partly in section, of a part of the filter unit of FIG. 1.

As best shown in FIG. 2, pipe 28, having a boss 30, is connected to the bottom of frame 24, intermediate the filter screens 26, and forms a passage for liquid flow from the framed area between the filter screens. The lower end 32 of pipe 28 fits into hole 20 in boss 18 on manifold 16. Prior to inserting the lower end 32 into hole 20, a sleeve 34 having at its upper end a lip 36 and at its bottom end an opening 38 covered by a guard screen 40 is positioned over the lower end 32 of pipe 28 and a sealing gasket 42 is positioned over sleeve 34. Gasket 42 forms a seal between boss 18, lip 36, and boss 30 when the filter element is in place on the manifold.

As shown in FIGS. 1, 2 and 3, each of the filtering elements 22 of the filter of FIG. 1 is identical and each element is provided in its pipe 28 with a guard screen 40. When all of the bosses 18 of the filter of FIG. 1 have, positioned thereon, filtering elements 22, the filtering elements are placed inside housing 2 by moving cover 6 into contact with flange 10 and tightening nuts 14. With cover 6 in place and nuts 14 tightened, the filter is ready for use.

The material to be filtered is pumped into housing 2 through conduit 4 and is collected and removed from the filter housing through manifold 16, all in the direction of the arrows in FIG. 1. The unfiltered material entering the housing through conduit 4 passes through filter screen 26 at one of the opposite sides of the filter element 22 and into the interior of the framed element. As the liquid passes through the filter screen, the solid contaminants are retained on the outer face of the filter screen, the filtered liquid passing into the frame. The filtered liquid passes out of the framed area through pipe 28, guard screen 40, and into manifold 16 and is removed from the filter. As is obvious, each of the filter elements 22 in housing 2 acts as a separate filtering unit and is connected, in parallel, to the single manifold 16.

The size of the openings in filter screens 26 of filtering elements 22 depends, to a large extent, on the filtering operation desired. Thus, where relatively large particles of contaminants are to be removed and smaller particles passed through the filter screen with the filtered liquid, relatively large openings are provided in the filter screen. Where, on the other hand, it is desired to remove relatively small as well as larger particles, the openings in the filter screen are proportionally smaller. As has been noted above, in some operations the filter screen may be precoated with the assistance of a filter aid, such as diatomaceous earth or clay.

If the openings in the guard screen 40 are substantially smaller than 1.2 times the openings in the filter screen 26 then some of the small particles passing through the filter screen 26, before a continuous coating or precoat is formed, would be caught and retained on guard screen 40 and eventually result in its plugging even with no failure of screen 26.

In order that screen 40 might pass the small particles present in the liquid during the initial coating or precoating of screen 26 in addition to passing the properly filter liquid, but at the same time prevent the passage of contaminated liquid when screen 26 fails, screen 40 which for purpose of convenience is hereinafter referred to as "guard screen" is provided with openings which are not substantially less than 1.2 times the size of the mesh openings in the filter screen but are not substantially larger than 2.5 times the size of the mesh openings in the filter screens.

In the instant invention, so long as filter screens 26 remain intact the liquid is filtered and passes out of the framed filter element through pipe 28 and into manifold 16. In passing out of the filter unit, the filtered liquid passes through guard screen 40. Guard screen 40 provides no filtering action, that is, all of the materials passing through filter screens 26 also pass through guard screen 40. Guard screen 40 becomes effective only after a hole or rip occurs in filter screen 26 or the filter screen otherwise fails to remove the contaminants, such as, by a failure of the connection between filter screen 26 and frame 24.

With guard screen openings as above specified, particles will not be retained by the guard screen either during the precoating or during the passage of properly filtered liquid and the guard screen will not become plugged or clogged. If during the filtering operation, the filter rips, tears or ruptures, allowing unfiltered, contaminated liquid to pass, the particles in the unfiltered liquid collect and are deposited on the guard screen, the guard screen is plugged and passage of liquid is stopped. It has also been discovered that, if the openings in the guard screen are substantially larger than 2.5 times the size of the openings in the filtering element, the guard screen will not collect the contaminants passed by a ripped, torn, ruptured or defective filter screen and will not become plugged and cut off the flow of contaminated, unfiltered liquid. Guard screens having openings 1.6 times the size of the openings in the filter screen have been found particularly suited for use in the practice of the instant invention.

In carrying out the instant invention it has also been discovered that the total area of the guard screen should not be so small, relative to the total area of the filter screens, that it offers appreciable resistance to the flow of filtered liquid when the filter screens are intact. The area of the guard screen should not, on the other hand, be very large relative to the filter screen which it guards. If the area of the guard screen is too large the openings in the guard screen will not be plugged or sealed by the solid particles in the contaminated liquid when the filter screen becomes defective and passes unfiltered liquid and cake materials.

Considerable latitude is afforded in the choice of guard screen area. Variations in the material of the guard screen, such as the size of wire used in weaving the screen, where a screen is employed, the type of weave used, and similar factors, make it difficult to specify a ratio of guard screen area to filter screen area which are suitable under all conditions. Generally speaking, however, it is preferred, for best results, to maintain the area of the guard screen in the ratio of 0.02% to 0.1% of the area of the filter screen.

The filter guard screen may be of any desired shape. Generally speaking, however, flat screens have been found unsatisfactory under normal conditions since the flat configuration does not afford sufficient strength to the screen to withstand repeated flexing under varying pressure. The conical shape of the guard screen shown in FIGS. 3 and 5 of the drawings is preferred. However, the guard screen may be shaped hemispherically, as a dome, with the convex or domed side of the screen facing the upstream direction from which the liquid flows.

The guard screen may be constructed of any material normally used for construction of filter elements. This includes, but is not limited to, wire, glass, cloth, paper, perforated metal, ceramic or plastic sheets. The material chosen must, of course, withstand attack by the liquid being filtered and be strong enough to withstand all pressures applied by the pumped liquid. It is desirable that the material chosen be sufficiently tough to permit cleaning without damage. However, this characteristic is not essential since the guard screen, being small, can usually be discarded and replaced economically.

When a filter element becomes defective, such as by ripping, tearing or the like, within a relatively short time the guard screen cakes up and plugs the outlet from the defective filter element preventing contaminants from passing the filter element and joining the properly filtered liquid from the other filter elements.

Where the filter elements are arranged in parallel, this is of a particular advantage since it allows the defective or damaged filter element to be automatically eliminated from the system without contaminating the system and, at the same time, permits the remainder of the parallel arranged filter elements to continue in operation.

With the guard screen of the defective filter element plugged, the remaining filter elements arranged in parallel with the defective elements continue to function, filtering the liquid. Should, during this continuing filtering action, another filtering element become defective by a hole or tear, the guard screen of that particular element will, in a relatively short time after the defect occurs, cake up and plug with the contaminant passing through the defect. Again, the damaged or defective element is automatically eliminated and the remaining intact filter elements continue to operate. Where a substantial number of filter elements are arranged in parallel, a number of individual elements may become defective and automatically be eliminated by plugging of each guard screen without stoppage or contamination of the over-all filtering operation.

The guard screen of the instant invention, in addition to the advantages noted above, has been found to have a further advantage. In many instances heretofore, considerable difficulty has been encountered in detecting damaged filter elements. Thus, it was necessary, in many instances where the filter was passing contaminated liquid because of a defective filter element, to disassemble, clean and inspect all of the filter elements to detect the defective element. As has been noted, if the defective element could not be detected in this manner it was often necessary to replace all of the filter units with new units and employ elaborate detection equipment to locate the defective unit among the units removed and replaced.

When the guard screen of the instant invention is employed, the guard screen of the defective filter element cakes or plugs, cutting off continued flow through the defective unit. Flow continues through the filter elements which are intact. Continued operation of the filter after the defective element is plugged causes the cake of contaminants to continue to build up or thicken on the filter units which are free of defects. Thus, when the filter is opened for cleaning, the difference in cake thickness is a clear indication as to the existence and location of the defective filter element. Hence, the defective filter element can be removed and replaced in a minimum of time and effort.

Many variations in the design and configuration of the filter and the guard screen are possible. One such modification is shown in FIGS. 4 and 5 in which the invention is shown adapted to an installation in which a pipe union is employed to interconnect the filter element with the manifold. In this modification, pipe 28 of FIG. 2, shown as 28a in FIG. 4, is threaded at its lower end with threads 50. Boss 18, on manifold 16, is provided with a nipple, shown as 52 in FIG. 4. Nipple 52 is threaded at its upper end with thread 54. Union sections 56, 58 are threaded on pipe 28a and nipple 52, respectively. At their inner ends, union sections 56, 58 are provided with tapered, mating seats which engage shoulder 60 on conically shaped screen 62. Union sections 56, 58 are held in liquid-tight engagement with shoulder 60 by collar 64.

The guard screen 62 of FIGS. 4 and 5 operates in the same manner as screen 40 of FIGS. 1 to 3. When the filter element guarded by guard screen 62 is intact, screen 62 passes the filtered liquid. When such filter element fails, such as by a hole, tear, or the like, the contaminant, passed by the filter element, collects or cakes on screen 62 and cuts off the flow of the liquid into pipe 52 and manifold 16. Modifications in the shape and design of the screen 62 to adapt the guard screen of the instant invention to the illustrated, as well as other, types of filter units, are obvious. The invention is adaptable for use on either pressure or vacuum filters.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:
1. A filter for filtering liquids comprising, a housing, an inlet in said housing for delivering unfiltered liquid into said housing, an outlet manifold in said housing for receiving the discharging filtered liquid from said housing, a plurality of filter elements in said housing fixed to said manifold at spaced points along said manifold in said housing, each of said filter elements having a filtering surface through which liquid delivered into said housing through said inlet passes, means on each of said filter elements for feeding liquid passed through said filtering surface into said manifold and a guard screen in each of said means for passing filtered liquid through said guard screen and for essentially preventing unfiltered liquid from passing through said guard screen, the size of the openings in said guard screen being not smaller than 1.2 times and not larger than 2.5 times the size of the openings in said filtering surface, the area of each of said guard screen being substantially less than the area of its filter element.

2. A filter as recited in claim 1 in which the area of said guard screen is not less than 0.02% and not larger than 0.1% of the area of said filter element.

References Cited
UNITED STATES PATENTS

| | | | |
|---|---|---|---|
| 2,761,529 | 9/1956 | Wisenbaugh | 210—446 X |
| 2,860,784 | 11/1958 | Breithaupt | 210—252 X |
| 2,975,903 | 3/1961 | Ulrich | 210—346 X |
| 3,000,505 | 9/1961 | Scavuzzo | 210—132 |

SAMIH N. ZAHARNA, Primary Examiner

U.S. Cl. X.R.
210—346